United States Patent [19]

Hotine

[11] 4,244,385

[45] Jan. 13, 1981

[54] FLUENT MATERIAL LEVEL CONTROL SYSTEM

[76] Inventor: William Hotine, P.O. Box 216, Albion, Calif. 95410

[21] Appl. No.: 102,736

[22] Filed: Dec. 12, 1979

[51] Int. Cl.³ .................. F17D 3/00; F04B 49/06; G01F 23/00
[52] U.S. Cl. ........................... 137/1; 73/304 R; 137/392; 307/118; 340/620; 361/178; 364/509; 417/36; 417/44
[58] Field of Search ............. 73/304 R; 137/1, 386, 137/392; 307/118; 340/620; 361/178; 364/509, 510, 562; 417/36, 44, 45

[56] References Cited

U.S. PATENT DOCUMENTS

| | | | |
|---|---|---|---|
| 3,131,335 | 4/1964 | Berglund et al. | 137/392 |
| 3,495,214 | 2/1970 | Wishart | 73/304 R |
| 3,540,027 | 11/1970 | Rauth et al. | 417/36 |
| 3,671,142 | 6/1972 | Calabrese | 137/392 |
| 3,727,182 | 4/1973 | Snyder | 340/620 |
| 3,790,936 | 2/1974 | Knoll | 340/620 |
| 4,112,318 | 9/1978 | Hamelink | 340/620 |
| 4,165,509 | 8/1979 | Betts et al. | 340/620 |
| 4,171,932 | 10/1979 | Miller | 417/36 |
| 4,182,363 | 1/1980 | Fuller | 340/620 |

FOREIGN PATENT DOCUMENTS 1386255 3/1975 United Kingdom .................. 137/392

Primary Examiner—Martin P. Schwadron
Assistant Examiner—G. L. Walton

[57] ABSTRACT

An improved system for sensing and controlling the level of fluent material in two reservoirs when material is transferred from one reservoir to the other. In electrically conducting materials, levels are sensed by direct current conduction between electrode pairs placed in each reservoir at desired "high" and "low" control levels which send D.C. digital logic sensing signals from these four sensors over connecting wires to four high resistance input circuits of a digital signal processing circuit; in electrically nonconducting materials, levels are sensed by suitable transducers which upon immersion send D.C. digital logic sensing signals to the digital signal processing circuit. The digital signal processing circuit receives the multiple sensor signals and provides a digital output signal or absence thereof, depending on the relative state and sequence of the sensing signals and transmits this digital output signal to the input circuit of a solid state relay, the output circuit of which controls the power of flow control means in a manner to maintain desired levels of fluent material in both reservoirs.

13 Claims, 2 Drawing Figures

FLUENT MATERIAL LEVEL CONTROL SYSTEM

BACKGROUND OF THE INVENTION

Reference is made to my patent application Ser. No. 21,906 filed 08/19/79 entitled "Fluent Material Level Control System" which describes a digital type level control system. In the reference invention, digital signals from "high" and "low" level sensors in a single reservoir are transmitted to a digital signal processing circuit the digital output signal of which is transmitted to a solid state relay which can control power to flow control means such as a pump or valve, for example, in a manner to maintain desired levels in this single reservoir. In the present improvement invention multiple digital signals from "high" and "low" level sensors in two reservoirs are transmitted to an improved new digital processing circuit the digital output signal of which is transmitted to a solid state relay which can control power to flow control means such as an electrically actuated pump or valve, for example, and thus control flow from one reservoir to the other in a manner to maintain desired levels of fluent material in both of the two reservoirs. The present invention is particularly useful in water supply systems pumping from a well to a storage tank, or in agriculture when pumping from a water supply to an irrigated field, as it senses levels at both source and destination reservoirs and controls the pump to maintain water at desired levels in both of the reservoirs. In a water supply system using an open storage tank, the present invention prevents both undesirable overflow and emptying of the tank, while in a water supply system using a pressure tank, the present invention enables elimination of the conventional electromechanical pressure switch used to control the pump in previous systems and uses "high" and "low" level sensors inside the pressure tank located at tank levels which produce the desired range of system pressures by compression of a proportionate volume of air in the tank. In this manner, the present invention provides an improved reliable and economical all solid state electronic level control system particularly adaptable to rural home and farm water systems, and is also adaptable to many other similar fluid handling processes using two reservoirs. The present improvement invention achieves its more complex operation by the use of an improved digital logic signal processing circuit capable of handling the multiple digital sensor signals from the two reservoirs and providing a digital output signal or absence thereof according to the states and sequences of the multiple sensor signals. This digital output signal is transmitted to a solid state relay which can control power to flow control means, such as a pump or valve, and thus control flow between the two reservoirs in a manner to maintain desired levels in both reservoirs.

SUMMARY OF THE INVENTION

The present invention is usefully applied on water wells, tanks, reservoirs, and fluid processes, for example. In the case of an open storage tank being filled from a well as in a rural or farm water system, the pump may be damaged or require priming if the well is pumped dry. Both water and power are wasted if the open storage tank overflows, while emptying the tank completely may result in an inconvenient or damaging loss of water supply. The function of the present invention, and its usefulness, is the prevention of all the above described undesirable circumstances by automatically stopping the pump before the water reaches either an undesired low level in the well or an undesired high level in the tank, and automatically starting the pump when either a desired safe level in the well is reached by inflow to the well or an undesired low level in the tank is reached by drainage of the tank.

The simple sensor electrodes of the present invention, for example, sense the presence of water by its electrical conductivity between them when submerged, and may be the stripped metallic ends of two insulated wire pairs suspended in the well, and two more wire pairs suspended in the tank. A first pair of ends, termed the well "low" sensor, is placed at a short distance above the pump intake pipe end or the check valve intake if a check or "foot" valve is used, and a second pair of ends, termed the well "high" sensor, is placed at a desirable distance above the first pair, taking into account the well recovery rate. A third pair of ends, termed the tank "high" sensor, is placed at a short distance below the top of an open tank, while a fourth pair of ends, termed the tank "low" sensor, is placed at a desirable distance above the bottom of the tank. One wire each of the well "high" and tank "low" wire pairs is connected to respective first and second input terminals of a digital signal processing circuit, with the other two wires connected to the D.C. positive voltage supply terminal, the seventh terminal, of this circuit. The eighth terminal of the processing circuit, is connected to negative supply voltage and ground. Digital voltage signals are transmitted to the first and second input terminals of the digital processing circuit by conduction between these sensor electrodes when they are immersed. The resistance of typical well water between the electrodes is in the order of thirty to fifty thousand ohms. The input circuits of the digital processing circuit have very high resistance and are loaded down to a resistance of approximately ten times this value or approximately three hundred to five hundred thousand ohms by connecting a resistor from each input to ground. A digital signal of approximately 90 percent of the supply voltage, a digital "one," is present at the input terminals of the processing circuit when the sensors are immersed, and a digital "zero" when the sensors are in the air, when resistance between the electrodes is very high, depending on the surface leakage over insulation between the electrodes. The electrodes are not harmed or electrolized by the small currents. Digital logic gates are internally connected to these digital processing circuit input terminals and receive the sensor signals, which are processed by the internal digital logic elements of the circuit to produce two separate digital output signals at the fifth and sixth terminals, which are two separate output terminals of the digital processing circuit. One wire each of the well "low" and tank "high" pairs are connected respectively to third and fourth input terminals of the digital processing circuit, with the other two wires connected to the fifth terminal of the digital processing circuit. This fifth terminal supplies a digital "one" voltage to these two sensors according to the digital logic processing of all input signals thus conditionally enabling digital "one" signals to be transmitted to the third and fourth input terminals of the digital processing circuit by conduction between electrodes of these two sensors when immersed, only if the fifth terminal of the circuit is supplied a digital "one" voltage from the internal digital logic process.

The sixth terminal of the digital processing circuit is the circuit output terminal which is internally connected to the logic elements and transmits a digital logic "one" output signal or absence thereof depending on the combination of differing multiple input signals from all of the sensors and the processing of these signals in the internal digital logic elements of the circuit. This digital "one" output signal is transmitted to the input circuit of a solid state relay to change the output state of the relay. Solid state relays are electronic circuits employing a light emitting diode (LED) which is lit by a digital signal "one" and illuminates a photocell controlling the gate and the "firing" of a thyristor or TRIAC, for example, which is in the power circuit to the pump motor. A digital "one" signal from the digital processing circuit sixth terminal thus can fire the TRIAC and turn "ON" the pump, while absence of an output signal, a "zero," can turn the pump "OFF," thus controlling the flow between well and tank in accordance with the digital processing of the differing multiple sensor signals.

The internal logic elements of the digital processing circuit include two AND gates, two inverters, one buffer, and one OR gate. A first input of a first AND gate is connected to the first input terminal of the processing circuit while the second input of this gate is connected to the output of a first inverter, the input of which is connected to the second input terminal of the processing circuit. A first input of a second AND gate is connected to the third input terminal of the processing circuit, while the second input of this gate is connected to the output of a second inverter, the input of which is connected to the fourth input terminal of the processing circuit. Each input terminal of the processing circuit and its connected gate input are connected to ground through a suitable resistor in the order of 0.5 megohms to prevent instability when input terminals are open circuited at "zero" signal input. The output of the first AND gate is connected to the first input of an OR gate, while the output of the second AND gate is connected to the input of a buffer, the output of which is connected to the second input of the OR gate and the sixth terminal, the processing circuit output terminal. The output of the OR gate is connected to the fifth terminal of the processing circuit, an output terminal furnishing voltage to well "low" and tank "high" sensors depending on conditions in the processing circuit.

Understanding operation of the digital processing circuit requires understanding of the functions of the individual logic elements used. An AND gate gives a digital "one" output only if both inputs are "one." An OR gate gives a digital "one" output only if either or both inputs are "one." An inverter gives a "one" output for a "zero" input, and a "zero" output for a "one" input. A NAND gate gives a "zero" output only if both inputs are "one." A buffer is an amplifier giving a "one" output only for a "one" input.

Assuming high water level in the well with "high" sensor conduction and low water level in the tank with "low" sensor nonconduction, a digital "one" at the first input terminal and a digital "zero" at the second input terminal of the processing circuit, inverted to a "one" by the connected inverter, will supply both first AND gate inputs with "ones" and result in an output "one" from this gate and an input "one" at the connected first OR gate input, with an OR gate output of "one" to the fifth or output terminal of the processing circuit thus supplying voltage to the well "low" and tank "high" sensors. The well "low" sensor conducts and transmits a "one" to the third input terminal so a "one" is present at the connected first input of the second AND gate, while the tank "high" sensor by its nonconduction, gives a "zero" to the fourth input terminal, inverted to a "one" at the second input of the second AND gate, the output "one" of this gate driving the connected buffer to a "one" output. This "one" is transmitted to the connected sixth terminal, the processing circuit output terminal, and to the second input of the OR gate to lock the OR gate output at a "one" and transmitting voltage via the fifth terminal of the processing circuit to both well "low" and tank "high" sensors, thus enabling these sensors to transmit a "one" by conduction, if submerged. The sixth processing circuit output terminal "one" activates the solid state relay and turns "ON" the pump to start filling the tank. As water level rises in the tank and falls in the well, it may pass either the tank "low" or well "high" sensors. If it rises and passes the tank "low" sensor, a "one" at a second processing circuit input terminal, when inverted by the connected inverter, is a "zero" at the second input of the first AND gate and a "zero" at the second input of the first AND gate and a "zero" appears at the gate output and first OR gate input. The OR gate output is still a "one," however, locked in this condition by a "one" at the third input terminal and a "zero" at the fourth input terminal of the processing circuit. If the water in the tank reaches the tank "high" sensor and it conducts, a "one" at the fourth input terminal of the processing circuit when inverted, is a "zero" at the second input of the second AND gate making a "zero" at the gate output and at the connected buffer output, thus transmitting a "zero" from the sixth terminal to the solid state relay and turning "OFF" the pump. Similarly, if the water in the well goes below the well "low" sensor while the water in the tank is below the tank "high" sensor, a "zero" is transmitted to the third input terminal and connected second AND gate first input, while the "zero" at the fourth input terminal, inverted to a one at the second input of the second AND gate, results in a "zero" gate output from this gate, resulting likewise in turning "OFF" the pump and also making a "zero" at the fifth terminal. As inflow to the well raises the water level, the well "low" sensor is disabled by a "zero" output at the fifth terminal, preventing off-on hunting at this level and providing a desirable dead band or hysteresis. When the water level in the well reaches a safe level and submerges the well "high" sensor, a "one" is transmitted by conduction of this sensor to the first input terminal and the connected first input of the first AND gate. If the tank demands water, with a level below the tank "low" sensor which then does not conduct, a "zero" at the second input terminal results and is inverted to a "one" at the second input of the first AND gate, giving a resultant gate output of "one," an OR gate first input of "one," an OR gate output of "one," and an "one" at the processing circuit fifth terminal which supplies voltage to the well "low" and tank "high" sensors again. The well "low" sensor conducts and transmits a "one" to the third input terminal and its connected first input of the second AND gate, while the tank "high" sensor is nonconducting making "zero" at the fourth input terminal which is inverted to a one at the second input of the second AND gate, making a gate output of "one," a buffer input and output of "one," and a "one" at the sixth or output terminal of the digital processing circuit which is transmitted to the solid state relay thus turning "ON" the pump again to fill the tank. The digital processing circuit by its logic arrangement thus processes the multiple input signals from the sensors under multiple level conditions to provide a digital output signal or absence thereof controlling a solid state relay which in turn controls the pumping from one reservoir to the other and maintains the desired levels in both well and tank.

The commercial integrated circuit gate packages contain four gates to a package. NAND gates with both inputs connected together act as inverters, and OR gates with both inputs connected together act as buffers. Two OR gates are paralleled for greater power output and used as the buffer, the output of which drives an L.E.D. in the solid state relay. The two remaining OR gates are connected in parallel and used as an OR gate. Two NAND gates are connected as inverters and used as first and second inverters, leaving two unused NAND gates available for use to light an L.E.D. indicator, if the well level is low, with these two NAND gates being paralleled for greater power output. The first input to both gates is connected to the first input terminal of the digital processing circuit from the "high" well sensor and the second input to both gates is connected to the positive voltage power supply terminal, while the outputs of both gates are connected to a L.E.D. (light emitting diode) indicator. Submersion of the "high" well sensor will transmit a "one" to the first inputs of both NAND gates and the second inputs receive a "one" from the supply voltage, which results in a "zero" gate common output which does not light the L.E.D. If the well level drops below the "high" well sensor, a "zero" at the first inputs of the NAND gates results in a "one" at the common gate output which lights the L.E.D. indicator and indicates low water in the well. Two AND gates are used for digital processing as first and second AND gates, leaving two unused AND gates available to light an L.E.D. indicator if the tank level is normal. The two AND gates are paralleled for greater power output, the first input to both gates is connected to the second input terminal of the digital processing circuit from the "low" tank sensor and the second input to both gates is connected to the positive voltage power supply terminal, while the outputs of both gates are connected to an L.E.D. indicator. Submersion of the "low" tank sensor will send a "one" to the first gate inputs, and the second gate inputs receive a "one" from the supply voltage, which results in a "one" common gate output which lights the L.E.D. when the "low" tank sensor is submerged and indicates normal level in the tank. If water is below this sensor resulting in a "zero" at the first AND gate inputs, the gate common output will be a "zero" and the L.E.D. does not light, indicating a low level in the tank. Connection of a remote level status indicator can be made to terminals provided in parallel with these indicators. The indicators facilitate fault diagnosis and can be operated when the power source is off by using a 12 volt battery connected to the power supply positive terminal and ground, due to the low current consumption of the gates and the L.E.D. indicators.

In the case of a water system using a pressure tank, sensors may enter the tank through electrically insulated conductors running through a pipe plug inserted in the tank. The sensors are located at "high" and "low" levels which produce the desired range of system pressures by compression of the requisite proportional volume of air at the top of the tank. A pressure gauge measures this pressure and indicates by a low pressure reading at the time of pump shut off by immersion of the tank "high" sensor that air has been absorbed in the water over a period of time and should be replaced with new fresh air. This is done by switching "OFF" the pump power source, closing the outlet valve, draining the tank, opening an air valve to admit new air, closing the air valve, turning "ON" the pump power source, and opening the outlet valve after the tank is filled.

Previous pressure tank water systems have used an electro-mechanical pressure switch for pump control. The present invention can eliminate this switch, which is often a source of trouble due to sediment impairing its operation. The electromechanical pressure switch also is subject to contact failure due to arcing between contacts. The present invention provides improved reliability and performance by virtue of its employment of solid state components and a digital system with no moving parts which protects the pump from damage and also incorporates indication of water levels in both tank and well and provides an anti-hunt hysteresis mode of operation.

The C.M.O.S. integrated circuit packages used to implement the invention are available commercially as CD 4071, a quadruple two input OR gate, CD 4011, a quadruple two input NAND gate, and CD 4081, a quadruple two input AND gate. The solid state relay may be purchased as a manufactured item or incorporated as suitable individual components with the integrated circuit packages which was done in reducing the present invention to practice. When very large pump motors requiring high voltage three-phase supply are used as in agriculture, for example, the solid state relay of the present invention can control high power motor starting equipment for these motors. This equipment can also be solid state, if desired.

The present invention is also adaptable for use with fluent material which is not electrically conductive, by using suitable sensors connected to the sensor wire pairs; these sensors should send a digital "one" upon immersion in the material and a "zero" when out of the fluent material. For example, a suitable sensor for oil or gasoline is a small diameter cylindrical glass enclosed hermetically sealed iron reed miniature switch which is actuated by a magnet contained in a toroidal float surrounding the switch when the float is borne upward by the level of the surface of the fluent material, closing the switch reed element circuit and thus transmitting a "one." A falling level will conversely open the switch and make a "zero." These switches as manufactured are very reliable and nonexplosive and can operate millions of times with the microampere range currents to the input gates of the present invention. Other suitable sensors for granular opaque fluent material can employ interruption of a light beam from an L.E.D. to a photocell, for example. In the case of corrosive fluent materials, such as acid, or mineral containing water, for example, parts of the sensor which are exposed to the fluent material must be resistant to corrosion. Insulating materials should be non-absorbent and non-wetting to minimize surface leakage. In the cases where surface leakage reduces the sensor nonconducting "zero" condition resistance, the loading resistors at the digital processing circuit inputs are accordingly suitably reduced in value to maintain the proper digital voltage "one" and "zero" ratio for good operation.

The present invention is also adaptable to agriculture, controlling water levels in both source and destination reservoirs, as for example, when pumping from a pond to a rice field. Other irrigation applications may use suitable sensor electrodes capable of contacting the soil and thus sensing soil moisture.

The use of the present invention also permits the maximum water production from a well having a slow recovery rate, as in a drought, for example, or where the water table has fallen low. The pump is protected from damage by dry pumping or damage by abrasive sediment such as sand, by properly locating the well low sensor. Submersible pumps can incorporate the system of the present invention within the pump and motor housing, if desired, to definitely locate the "high" and "low" well sensors in relation to the pump if it is raised or lowered. Tank sensors can be connected in this case by wires or can be omitted if desired, with pump protection provided by the well sensors alone.

A number of reservoirs may be controlled by the system, using appropriate switching of reservoir sensors and corresponding switching and operation of feed valves to the reservoirs.

When hydraulic heads permit, an electrically operated valve may take the place of a pump in controlling transfer of fluid from a first to a second reservoir, using the system of the present invention.

Therefore, it is an object of the invention to provide an improved system for level control of fluent material in two interconnected reservoirs capable of automatically maintaining desired levels in both reservoirs by controlling the flow of material from one reservoir to the other.

Another object of the invention is to provide a simple, reliable, and economical all solid state electronic control system using digital logic signals from high and low level sensors in each of two interconnected reservoirs and processing these signals in a manner to enable control of flow between the reservoirs and maintenance of predetermined high and low levels.

Another object of the invention is to provide a level control system for two interconnected reservoirs which is adaptable to electronically conducting, electrically nonconducting, granular or opaque fluent materials by the use of suitable level sensors or transducers which transmit a digital signal upon immersion in the material and terminate the signal upon emergence from the material.

Still another object of the invention is to provide a level control system for two interconnected reservoirs which has an anti-hunt hysteresis or dead band mode of operation in each of the reservoirs.

These objects and features of the present invention and the construction of the invention can be understood from the accompanying drawings and the following written description.

DESCRIPTION OF PREFERRED EMBODIMENT

Figure 1:
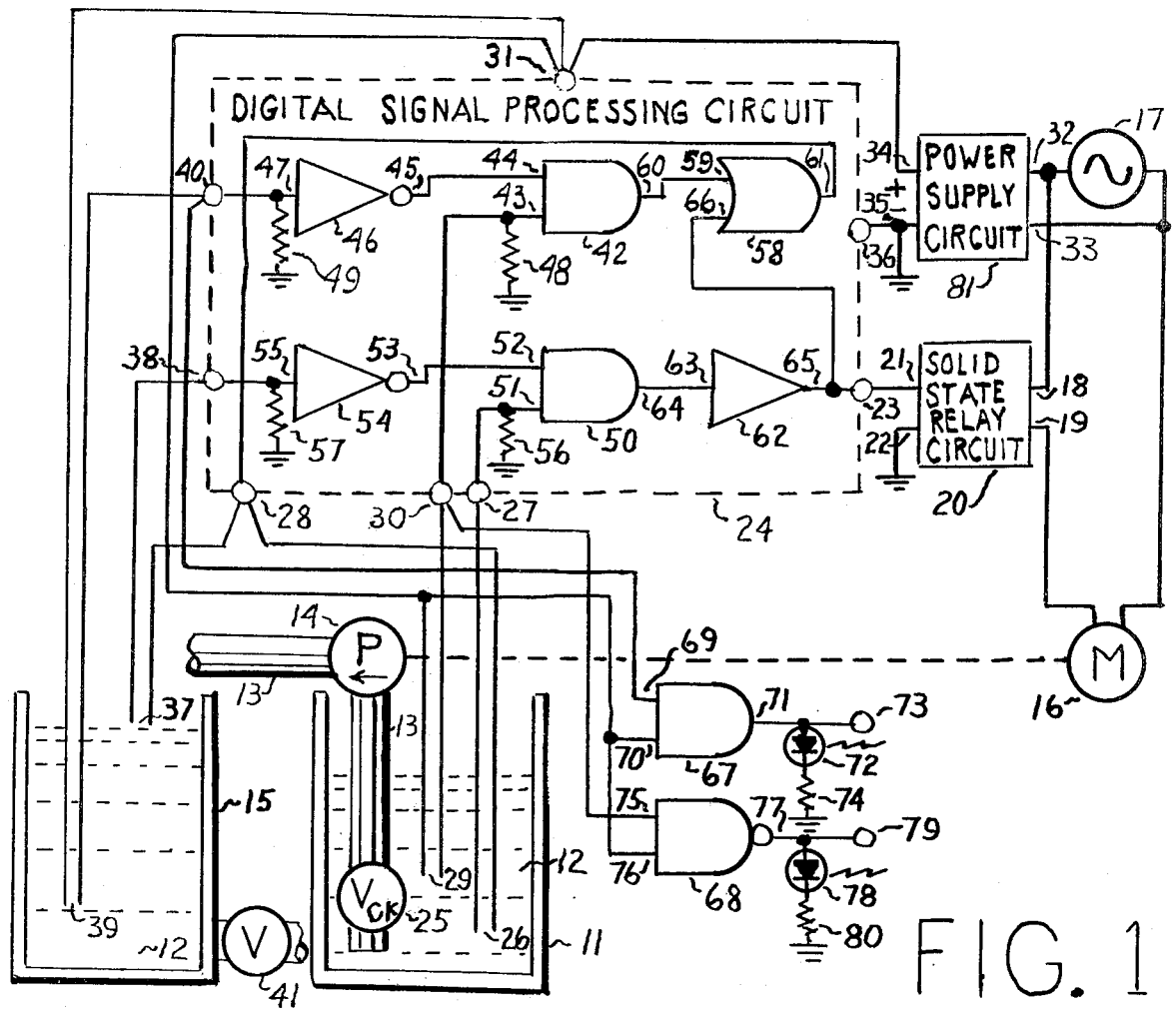
FIG. 1 is a schematic diagram of the present invention as used in a water system, showing a well and an open storage tank interconnected by piping with a pump for fluid transfer between reservoirs, and showing the digital logic processing circuit components connected to high and low level sensors in the two reservoirs, and showing connections to visible indicators of tank and well level, with the power supply and solid state relay circuits shown in block diagram form.

The system of the invention as shown in FIG. 1 includes all functions of the present invention as used in a water system to maintain the fluid within desired high and low levels in both well and tank while pumping from the well into an open storage tank.

The system of FIG. 1 is also equally applicable to valve controlled transfer of fluid between two reservoirs when hydraulic heads permit this.

Referring to FIG. 1, a reservoir or well 11 is shown filled with water 12, which enters the well from the surrounding earth and is pumped through pipe 13 by pump 14 to an open storage tank 15. Pump 14 is driven by motor 16 which is supplied electrical power from a source 17. The power to motor 16 is connected through the output terminals 18 and 19 of a normally open solid state relay circuit 20 shown in block diagram form, which has an input terminal 21 and a ground terminal 22. The solid state relay 20 closes the circuit between output terminals 18 and 19 when actuated at the input terminal 21 by a digital "one" signal from the connected output terminal 23 of the digital processing circuit 24 which is shown inside the dotted line enclosure. Inside the well 11, at a suitable level above the inlet to the check valve 25 a "low" level sensor 26 is placed, connected by wires to an input terminals 27 and to an output terminal 28 of the digital signal processing circuit 24. The sensors may be the exposed metallic ends of insulated wires or sutable corrosion resistant electrodes attached to the wires. Also inside well 11, at a suitable distance above sensor 26, a "high" level sensor 29 is placed, connected by wires to an input terminal 30 and to the power input terminal 31 of the digital processing circuit 24. A power supply circuit 81 is shown in bock diagram form, with input terminals 32 and 33 connected to power source 17, with a positive output terminal 34 connected to terminal 31 of circuit 24, and with a negative output terminal 35 connected to ground and to terminal 36 of circuit 24. Terminals 31 and 36 of circuit 24 are internally connected to supply operating voltage to the logic elements of the digital signal processing circuit 24. Inside the tank 15, at a suitable level below its top, a "high" level sensor 37 is placed, connected by wires to an input terminal 38 and output terminal 28 of the circuit 24. Also inside the tank, at a suitable level above the drain valve 41, a low level sensor 39 is placed, connected by wires to an input terminal 40 and the positive voltage supply terminal 31 of circuit 24. The internal digital logic elements of the digital processing circuit 24 are shown with their connections in conventional symbolic form inside the dotted line enclosure. A first AND gate 42 has its first input 43 connected to circuit input teminal 30 and its second input 44 is connected to output 45 of inverter 46, whose input 47 is connected to circuit input terminal 40. Inputs 43 and 47 are respectively grounded through high resistances 48 and 49. A second AND gate 50 has its first input 51 connected to circuit input terminal 27 and its second input 52 is connected to output 53 of inverter 54, whose input 55 is connected to circuit input terminal 38. Inputs 51 and 55 are respectively grounded through high resistances 56 and 57. An OR gate has its first input 59 connected to the output 60 of the first AND gate 42, and the OR gate output 61 is connected to circuit output terminal 28. A buffer 62 has its input 63 connected to output 64 of the second AND gate 50, and the buffer output 65 is connected to the second input 66 of OR gate 58 and to circuit output terminal 23. Shown external to the digital processing circuit 24 as they do not participate in the operation of circuit 24, are AND gate 67 and NAND gate 68 and their level indicator circuits. A first input 69 of AND gate 67 is connected to input terminal 40 of circuit 24 with the second input 70 connected to the positive supply terminal 31 of circuit 24. The output 71 of AND gate 67 is connected to a light emitting diode indicator LED 72 and to a remote indicator output terminal 73. The LED 72 is grounded through voltage dropping resistor 74. A first input 75 of NAND gate 68 is connected to input terminal 30 of circuit 24 with the second input 76 connected to the positive supply terminal 31 of circuit 24. The output 77 of NAND gate 68 is connected to LED indicator 78 and to a remote indicator output terminal 79. The LED 78 is grounded through voltage dropping resistor 80.

The operation of the circuit of FIG. 1 under the conditions of high water level in the well 11 and low water level in the 15 is described as follows: Well sensors 26 and 29 are conductive when submerged. High sensor 29 is supplied voltage from terminal 31 and transmits a digital "one" to input terminal 30 of the digital processing circuit 24 and connected first input 43 of first AND gate 42. As both inputs 43 and 44 of AND gate 42 are "one," the output 60 of this gate is "one" which is applied to first input 59 of OR gate 58 resulting in a "one" at the OR gate output 61 and its connected output terminal 28 of circuit 24. The "one" at terminal 28 is transmitted to connected low well sensor 26 which transmits a "one" to input terminal 27 of the digital processing circuit and connected first input 51 of second AND gate 50. A "zero" is present at input terminal 38 as high tank sensor 37 is in air, with a "zero" at connected input 55 of second inverter 54 which gives a "one" at the inverter output 53 and connected second input 52 of second AND gate 50. As both inputs 51 and 52 of AND gate 50 are "one," the output 64 of this gate is "one" which is applied to input 63 of buffer 62 which then gives a "one" at its output 65, connected OR gate second input 66 and connected output terminal 23 of the digital processing circuit 24. The "one" at the OR gate 58 second input 66 "locks" this gate around a feedback loop from its output 61 to terminal 28, to sensor 26, to input terminal 27, to input 51 of AND gate 50, and its output 64, input 63 and output 65 of buffer 62, returning to second input 66 of OR gate 58. The output "one" from terminal 23 and connected input 21 of the solid state relay circuit 20 energizes the normally open relay circuit and closes the circuit between its output terminals 18 and 19 thus starting motor 16 and pump 14 to start filling the tank 15. As water level rises in the tank 15 and falls in the well 11 it may pass either the tank "low" or well "high" sensors. If it passes the tank "low" sensor 39, a "one" is transmitted to input terminal 40 and input 47 of inverter 46, giving a "zero" at output 45 of the inverter and its connected input 44 of AND gate 42. Output 60 of AND gate 42 is consequently "zero," and connected OR gate input 59 is "zero." The OR gate output 61 still remains a "one" because it is still "locked" by the feedback loop through output terminal 28 which was described above. The feedback loop thus maintains an output "one" at terminal 23 to continue pumping while tank low sensor 39 is being submerged. If the water level in the tank reaches the high sensor 37, sensor 37 transmits a "one" to input terminal 38 and its connected input 55 of inverter 54, whose output 53 is then a "zero," and connected input 52 of AND gate 50 is a "zero" making the gate output 64 a "zero." The connected input 63 of buffer 62 is "zero" and its output 65 is "zero," with a "zero" at connected input 66 of OR gate 58 and output terminal 23 of circuit 24. The "zero" at input terminal 66 of OR gate 58 breaks the feedback loop through the OR gate 58 and output terminal 28 and makes a "zero" at terminal 28, thus de-energizing well sensor 26 and tank sensor 37. The "zero" at connected input 21 of relay 20 returns the solid state relay 20 to its normally non-conducting state between its output terminals 18 and 19 thus stopping the motor 16 and pump 14 and preventing overflow of the tank. In a similar manner, if the water level in the well goes below the "low" well sensor 26, with the level in the tank below the "high" tank sensor 37, a "zero" appears at input terminal 27 and connected input 51 of AND gate 50, resulting in a "zero" at the gate output 65, OR gate input 66 and output terminal 23 of circuit 24. The "zero" at connected input 21 of relay 20 returns the relay to its normally non-conducting state between its output terminals 18 and 19 thus stopping the motor 16 and pump 14 and protecting the pump by preventing dry pumping. As inflow to the well raises the water level and the well "low" sensor 26 is submerged, it cannot transmit a "one" as output terminal 28 has been deenergized as described above and does not supply voltage to "low" well sensor 26. The output terminal 23 continues to supply a "zero" to the solid state relay 20 so that motor 16 and pump 14 are "OFF." In this manner OFF/ON hunting and a desirable dead band or hysterisis is provided. When the water in the well reaches a safe level and submerges the "high" well sensor 29, a "one" is transmitted to input terminal 30 and connected input 43 of AND gate 42. If the tank level is low, with a level below tank "low" sensor 39, the sensor 39 does not conduct and a "zero" is present at input terminal 40 and connected input 47 of inverter 46, whose output 45 is consequently a "one" which appears at connected input 44 of AND gate 42. The "one" at both AND gate 42 inputs results in a "one" at the gate output 60 and its connected input 59 of OR gate 58. The OR gate output 61 is thus a "one" and the connected output terminal 28 supplies voltage to both "high" tank sensor 37 and "low" well sensor 26, thus enabling well sensor 26 to transmit a "one" to input terminal 27 as sensor 26 is submerged and conducts. The "one" at input terminal 27 makes the connected input 51 of AND gate 50 a "one." As the tank "high" sensor is in air and is non-conducting, a "zero" is present at input terminal 38 and connected input 55 of inverter 54, whose output 53 is then a "one" and connected input 52 of AND gate 50 is a "one." As the two inputs 51 and 52 of AND gate 50 are "ones," the gate 50 output 64 is a "one" making the connected input 63 of buffer 62 and its output 65 a "one," connected OR gate input 66 a "one," and connected output terminal 23 of circuit 24 a "one." The connected input 21 of relay 20 is a "one" and relay outputs 18 and 19 are a closed circuit starting motor 16. The above described cycle of circuit operation reestablishes the feedback loop through terminal 28 and restarts the motor and pump to fill the tank after the water has reached a safe level. The digital processing circuit 24 by the logic arrangement described thus processes the multiple conditional signals from the sensors under different level conditions of both well and tank to provide a digital output signal or absence thereof at terminal 23 which controls the solid state relay 20, the motor 16 and the pump 14 in a manner to maintain desired levels in both well 11 and tank 15.

The water levels in both well 11 and tank 15 are monitored and indicated by LED indicators 78 and 72 respectively and their associated circuits. Well water level above the well "high" sensor 29 will cause this sensor to conduct and transmit a "one" to the input terminal 30 and connected first input 75 of NAND gate 68. The second input 76 of the NAND gate 68 is supplied a "one" from connected terminal 31 of circuit 24. Consequently, the output 77 of NAND gate 68 is a "zero" for a "one" at both inputs 75 and 76 and connected LED indicator 78 is dark for indication of normal water level in the well 11. If water level falls below well sensor 29 a "zero" appears at input terminal 30 and connected input 75 of NAND gate 68, resulting in a "one" at the gate output 77 and the connected output terminal 79 for a remote indicator. The "one" at output 77 of gate 68 also lights connected LED indicator 78 to indicate a low level in well 11. Water level in tank 15 above tank "low" sensor 39 will cause this sensor to conduct and transmit a "one" to the input terminal 40 and connected first input 69 of an AND gate 67. The second input 70 of the AND gate 67 is supplied a "one" from connected terminal 31 of circuit 24. Consequently, the output 71 of AND gate 67 is a "one" for a "one" at both inputs 69 and 70, connected LED indicator 79 lights to indicate normal water level in tank 15, and a "one" is present at connected remote indicator terminal 73. If water level falls below tank sensor 39 a "zero" appears at input terminal 40 and connected input 69 of AND gate 67 resulting in a "zero" at the gate output 71 and connected LED indicator 72 is dark for indication of low water level in tank 15, and a "zero" is present at remote indicator terminal 73.

Figure 2:
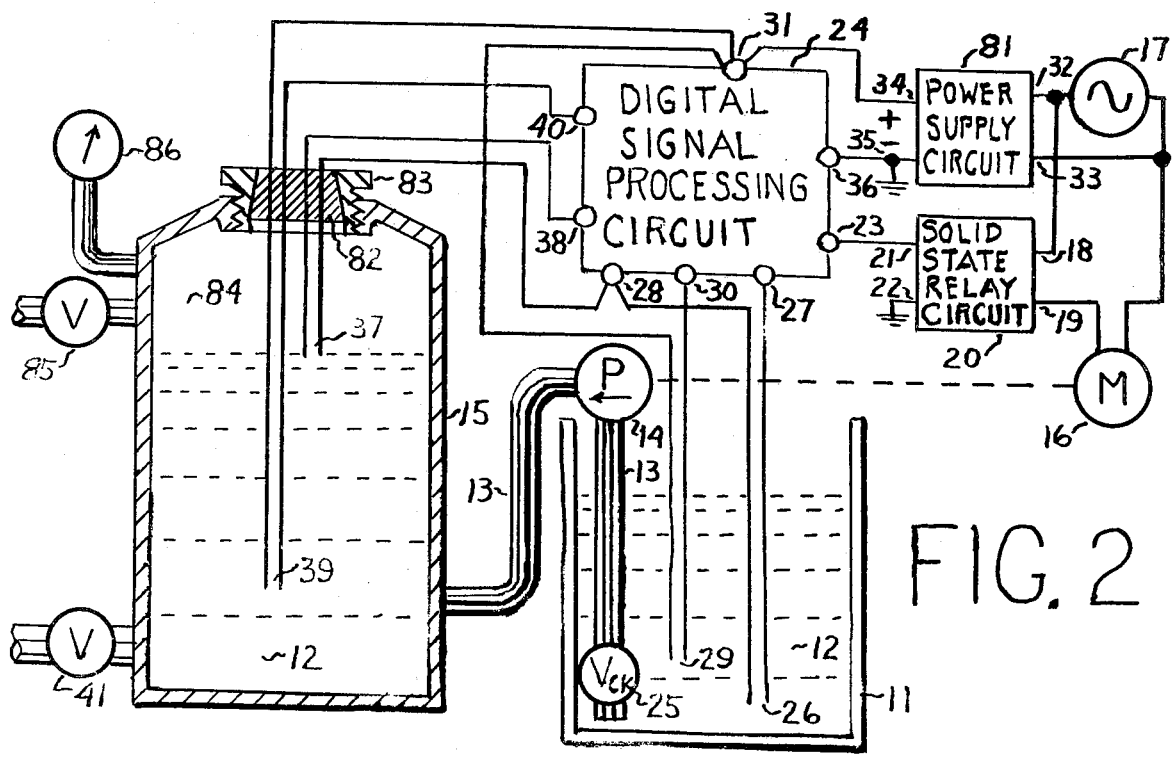
FIG. 2 is a block diagram of the present invention aas used in a water system, showing a well and a cross-sectional view of a closed pressure tank interconnected by piping with a pump for fluid transfer between reservoirs, and showing the well and tank high and low level sensors with their connections to the digital logic processing circuit, and omitting visible indicators shown in FIG. 1 for simplicity.

The system of the invention as shown in FIG. 2. shows its use in a water system consisting of a well 11 and a pressure tank 15, with the digital signal processing circuit 24, power supply circuit 81 and solid state relay circuit 20 shown in block diagram form, and with water level indicators omitted for simplicity. Referring to FIG. 2 a reservoir or well 11 is shown filled with water 12 which enters the well from the surrounding earth and is pumped through pipe 13 by pump 14 to a closed pressure tank 15. Pump 14 is driven by motor 16 which is supplied electrical power from a souce 17. The power to motor 16 is connected through the output terminals 18 and 19 of a normally open solid state relay circuit 20 shown in block diagram form, which has an input terminal 21 and a ground terminal 22. The solid state relay 20 closes the circuit between output terminals 18 and 19 when actuated at the input terminal 21 by a digital "one" signal from the connected output terminal 23 of the digital processing circuit 24. Inside the well 11, at a suitable level above the inlet to the check valve 25 a "low" level sensor 26 is placed, connected by wires to an input terminal 27 and to an output terminal 28 of the digital signal processing circuit 24. Also inside well 11, at a suitable distance above sensor 26, a "high" level sensor 29 is placed, connected by wires to an input terminal 30 and to the power input terminal 31 of the digital processing circuit 24. A power supply circuit 81 is shown in block diagram form, with input terminals 32 and 33 connected to power source 17, with a positive output terminal 34 connected to terminal 31 of circuit 24, and with a negative output terminal 35 connected to ground and to terminal 36 of circuit 24. Terminals 31 and 36 of circuit 24 are internally connected to supply operating voltage to the logic elements of the digital signal processing circuit 24 which are the same as previously described in FIG. 1. Inside the tank 15, which is shown in cross section, at a suitable level below its top, a "high" level sensor 37 is placed, connected by wires to terminals 28 and 38 of circuit 24, these wires running through insulation 82 in pipe plug 83 which screws into a threaded opening in the top of tank 15 and seals this opening to retain air 84 under pressure in the top part of the tank. Also inside the tank, at a suitable level above the drain valve 41, a low level sensor 39 is placed, connected by wires running through the insulation 82 in plug 83 to an input terminal 40 and the positive voltage supply terminal 31 of circuit 24. The "low" level sensor 39 is placed at a level which results in the volume of air above it being compressed to the low pressure limit desired in the water system while the "high" level sensor 37 is placed at a level which results in the volume of air above it being compressed to the high pressure limit desired in the water system. A gauge 86 is connected by pipe to tank 15 to read air pressure, and a valve 85 is provided to admit air if needed. An outlet drain valve 41 is connected to tank 15 and the system piping.

The operation of the system of FIG. 2 is similar to the operation of FIG. 1 which has been described, as the circuits 24, 20, and 81 are the same in both figures. When the water level drops below "low" level tank sensor 39 the pressure in the tank 15 and the water system is at the desired low pressure and the pump 14 operates to refill the tank. When the water level reaches the "high" level tank sensor 37 the pump 14 is stopped and the water system is at the desired high pressure.

While the preferred embodiment of the invention has been described, the form of the invention described should be considered as illustrative and not as limiting the scope of the following claims.

I claim:

1. An improved fluent material digital-type level control system wherein the improvement comprises:
   a. A first reservoir containing a fluent material;
   b. a second reservoir containing said fluent material;
   c. flow control means for controlling transfer of said material from said first reservoir to said second reservoir;
   d. an upper sensor operably positioned at desired levels within each of said reservoirs; said upper sensors operable to transmit a digital signal voltage upon immersion in said fluent material in response to a rise in level of said material;
   e. a lower sensor operably positioned below said upper sensor at desired levels within each of said reservoirs, said lower sensor operable to terminate said digital signal voltage upon emergence of said lower sensor from said material in response to a fall in level of said material;
   f. a digital signal processing circuit having input terminals and an output terminal, said input terminals operably connected to said upper and lower sensors, said processing circuit including digital logic circuit means operably connected to said terminals of said processing circuit, said processing circuit providing a digital output signal at said output terminal upon immersion in said material of said upper sensor of said first reservoir and the emergence from said material of said lower sensor of said second reservoir, and terminating said output signal upon the emergence from said material of said lower sensor of said first reservoir and the immersion in said material of said upper sensor of said second reservoir;

g. a solid state relay having an input circuit and an output circuit, said relay input circuit operably connected to receive said output signal from said output terminal of said digital processing circuit actuating said relay to close said relay output circuit; and h. said flow control means operably connected to a power source through said relay output circuit, with said flow control means operated by said relay output circuit to control flow of said material between said reservoirs in a manner to maintain levels of said material within said desired levels in said reservoirs.

2. The system of claim 1 wherein said material is electrically conductive and each of said sensors is comprised of two spaced electrodes exposed for immersion in said material, said electrodes operably connected to transmit a digital voltage signal upon immersion in said material and to terminate said signal upon emergence from said material.

3. The system of claim 1 wherein said material is electrically non-conductive and each of said sensors is comprised of a transducer operably connected to transmit a digital voltage signal upon immersion in said material and to terminate said signal upon emergence from said material.

4. The system of claim 1 wherein said digital signal processing circuit includes a digital logic circuit supplied with operating voltage, said digital logic circuit being comprised of:

a first two input AND gate having an output, with the first input of said gate operably connected to said upper sensor of said first reservoir and the second input of said gate operably connected to the output of a first inverter, with the input of said inverter operably connected to said lower sensor of said second reservoir;

a second two input AND gate having an output, with the first input of said gate operably connected to said lower sensor of said first reservoir and the second input of said gate operably connected to the output of a second inverter, with the input of said inverter operably connected to said upper sensor of said second reservoir;

a two input OR gate having an output, with the first said input of said OR gate connected to said output of said first AND gate, said output of said OR gate operably connected to said lower sensor of said first reservoir and to said upper sensor of said second reservoir to transmit a digital voltage signal from said output of said OR gate to said sensors enabling said sensors to transmit said digital signal upon immersion in said material;

a buffer having an input and an output, with said input connected to said output of said second AND gate, and with said output of said buffer connected to said second input of said OR gate; and a connection from said output of said buffer for delivering an output signal from said digital processing circuit, said digital logic circuit operating to deliver said output signal when the level of said material immerses said upper sensor of said first reservoir and falls below said lower sensor of said second reservoir, said logic circuit operating to terminate said output signal from said processing circuit when the level of said material immerses said upper sensor of said second reservoir and falls below said sensor of said first reservoir.

5. The system of claim 1 wherein said normal operating state of said solid state relay output circuit is an open circuit, said output signal from said processing circuit actuating said output circuit of said relay to close said output circuit.

6. The system of claim 1 wherein said flow control means includes an electrically actuated pump for pumping said material through connecting piping between said reservoirs.

7. The system of claim 1 wherein said flow control means includes an electrically actuated valve for controlling the flow of said material through connecting piping between said reservoirs.

8. The system of claim 1 wherein said upper and lower sensors each comprise spaced electrodes extending from a protective corrosion resistant insulating covering, the material of said electrodes being resistant to corrosion by said fluent material.

9. The system of claim 1 wherein each of said sensors in said second reservoir is comprised of spaced sheet electrodes attached to opposite sides of a sheet of insulating material.

10. The system of claim 1 wherein each of said input terminals of said digital processing circuit is connected to ground through a resistance.

11. The system of claim 1 wherein the input terminal of said digital processing circuit which is connected to the upper sensor of the first reservoir is connected to a first input of a two input NAND gate, the second said input of said NAND gate is connected to the positive terminal of the digital logic power supply and the output of said NAND gate is connected to a light emitting diode indicator and an output terminal for remote indication of fall in level of said material below said sensor, or low level.

12. The system of claim 1 wherein the digital processing circuit input terminal connected to the lower sensor of the second reservoir is connected to a first input of a two input AND gate, the second input of said AND gate is connected to the positive terminal of the digital logic power supply and the output of said AND gate is connected to a light emitting diode indicator and an output terminal for remote indication of immersion of said sensor in said material, or normal level.

13. The method of controlling the level of fluent material during transfer of said material between two reservoirs and maintaining said level between desired high and low levels in each of said reservoirs, said method comprising:

detecting increasing or decreasing levels of said material by using upper and lower level sensors placed at said desired levels in each of said reservoirs, said sensors individually transmitting a digital voltage output signal upon immersion in said material and terminating said digital output signal upon emergence from said material;

transmitting said digital voltage signals from said sensors to input circuits of a digital signal processing circuit being supplied with operational power from a connected power supply and having an output circuit;

processing said digital signals in said processing circuit in a manner producing a digital output signal from said processing circuit when the increasing level of said material in said first reservoir immerses said upper sensor and when the decreasing level of said material in said second reservoir falls below said lower sensor, and terminating said digital output signal from said processing circuit when the increasing level of said material in said second reservoir immerses said upper sensor and when the decreasing level of said material in said first reservoir falls below said lower sensor;

transmitting said digital output signal from said processing circuit to the input circuit of a solid state relay having an input circuit and an output circuit, said relay output circuit being serially connected between a source of electrical power and power driven flow control means for regulating flow of said material being transferred between said reservoirs, said relay input circuit responding to said output signal from said digital processing unit and changing the normal operating state of said relay output circuit;

operating said flow control means by said change of state of said relay output circuit; and controlling flow of said material in a manner to maintain level of said material within said desired levels in each of said reservoirs.

* * * * *